United States Patent [19]

Kobayashi et al.

[11] Patent Number: 4,747,602

[45] Date of Patent: May 31, 1988

[54] SYNTHETIC RESIN SEALING RING ASSEMBLY WITH METAL FILM LAYER

[75] Inventors: Daisaku Kobayashi; Tunesaku Itaba; Koichiro Kasahara, all of Kashiwazaki; Yutaka Momose, Anjyo; Tomokimi Mizuno, Chiryu, all of Japan

[73] Assignees: Kabushiki Kaisha Riken, Tokyo; Aisin Seiki Kabushiki Kaisha, Aichi, both of Japan

[21] Appl. No.: 60,352

[22] Filed: Jun. 10, 1987

[30] Foreign Application Priority Data

Jun. 21, 1986 [JP] Japan .............................. 61-94013[U]

[51] Int. Cl.[4] .............................. F16J 9/14; F16J 9/28
[52] U.S. Cl. .................................... 277/216; 277/221; 277/235 A
[58] Field of Search ........................ 277/216, 220–222, 277/235 R, 235 A, DIG. 6, 236

[56] References Cited

U.S. PATENT DOCUMENTS

| 2,759,777 | 8/1956 | Anderson | 277/221 X |
| 2,807,511 | 9/1957 | Fleming | 277/235 A X |
| 2,877,071 | 3/1959 | Arnot | 277/216 X |
| 3,655,208 | 4/1972 | Walker | 277/221 |
| 3,936,295 | 2/1976 | Cromwell et al. | 277/216 X |
| 4,206,930 | 6/1980 | Thrane et al. | 277/216 X |
| 4,432,925 | 2/1984 | Holtzberg et al. | 277/216 X |

Primary Examiner—Robert S. Ward
Attorney, Agent, or Firm—Finnegan, Henderson, Farabow, Garrett and Dunner

[57] ABSTRACT

A sealing ring assembly comprises a synthetic resin sealing ring body having two opposing stepped cut surface portions including respective planer portions in sliding contact with each other, a synthetic resin gas sealing ring in contact with the inner circumferential surface of the sealing ring body, and a metal ring in contact with the inner circumferential surface of the gas sealing ring. To prevent the stepped cut surface portions from sticking to each other at the planar portions thereof, a metal film layer is provided on a planar portion of one of the stepped cut surface portions.

5 Claims, 2 Drawing Sheets

SYNTHETIC RESIN SEALING RING ASSEMBLY WITH METAL FILM LAYER

BACKGROUND OF THE INVENTION

1. Field of the Invention

This invention relates to a sealing ring assembly in which the stepped cut surfaces of a sealing ring body are prevented from sticking to each other, thereby making it possible for the sealing ring assembly to be used for an extended period of time while vibrating under conditions of high temperature and pressure.

2. Description of the Prior Art

As shown in FIG. 1, a sealing ring body 4 made of synthetic resin includes stepped cut surface portions 5 having opposing planar portions 9 in contact with each other. When the sealing ring body 4 is fitted into the ring groove of a self-lubricating compressor piston, a fluid path is formed as indicated by the arrows, as a result of which leakage of high-pressure fluid occurs. To solve this problem, a sealing ring assembly is constructed by combining the sealing ring body 4 with a gas sealing ring 6 made of synthetic resin and a ring 8 made of metal, as shown in FIGS. 2 and 3. This arrangement prevents the leakage of high-pressure fluid and enhances sealing effectiveness.

The gas sealing ring 6 has approximately the same height as the sealing ring body 4 and is in contact with an inner circumferential surface 10 of the sealing ring body 4. In general, the gas sealing ring 6 and sealing ring body 4 consist of PTFE (polytetrafluoroethylene). The metal ring 8 has approximately the same height as the ring 6 and is in contact with the inner circumferential surface of the gas sealing ring 6. The gas sealing ring 6 serves to close the inner circumferential side of gaps 12, 12' between the stepped cut surface portions 5 of the sealing ring body 4. As a result, a fluid which flows into the gap 12 cannot flow into the interior of a ring groove 2 (FIG. of a piston 1. In addition, a high-pressure fluid which flows into the ring groove 2 from between the upper surface of the sealing ring body 4 and upper surface of the ring groove 2 cannot flow into the gap 12' due to the presence of the gas sealing ring 6. Thus, the flow path shown by the arrows in FIG. 1 is not formed in the example of the sealing ring assembly of FIGS. 2 through 4, by virtue of which the assembly provides a highly effective seal. The metal ring 8 urges the sealing ring body 4 and gas sealing ring 6 in the direction of an inner circumferential surface 3 of a cylinder so that the outer circumferential surface of the sealing ring body 4 is brought into sliding contact with the inner circumferential surface 3 of the cylinder at a desired pressure. In FIG. 4, numeral 7 denotes the cut surface portion of the gas sealing ring 6, and numeral 7' denotes the cut surface portion of the metal ring 8.

When the above-described sealing ring assembly is installed in e.g. a self-lubricating compressor and is used for an extended period of time at high pressure while vibrating under a high temperature, the planar portions 9 of the stepped cut surface portions 5 stick together, and sticking also occurs between the inner circumferential surface 10 of sealing ring body 4 and the outer circumferential surface of the gas sealing ring 6, which are in sliding contact with each other, in the vicinity of the stepped cut surface portions. This sticking phenomenon, which occurs despite use of the PTFE material, inhibits the relative movement between the rings 4 and 6 and alters the tension of the sealing ring body 4. The sticking together of the planar portions 9 similarly alters the tension of the sealing ring body 4. This detracts from the sealing property of the sealing ring assembly, adversely affects the contact pressure with the inner circumferential surface of the cylinder, and impedes follow-up response.

SUMMARY OF THE INVENTION

Accordingly, an object of the present invention is to provide a sealing ring assembly in which the sealing property is maintained and a stable contact pressure and follow-up response are obtained by preventing the aforementioned sticking phenomenon.

According to the present invention, the foregoing object is attained by providing a sealing ring assembly comprising a synthetic resin sealing ring body having an inner circumferential surface and two opposing stepped cut surface portions each of which includes a planar portion, a synthetic resin gas sealing ring in contact with the inner circumferential surface of the sealing ring body and having an inner circumferential surface, and a metal ring in contact with the inner circumferential surface of the gas sealing ring, characterized in that a metal film layer is provided on the planar portion of one of the stepped cut surface portions and on the inner circumferential surface of at least the inner circumferential surface of this stepped cut surface portion.

Thus, even if the sealing ring body and gas sealing ring are made of synthetic resin, the two rings will not stick together, thereby stabilizing the contact pressure of the sealing ring body with respect to the inner circumferential surface of the cylinder as well as the follow-up response.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
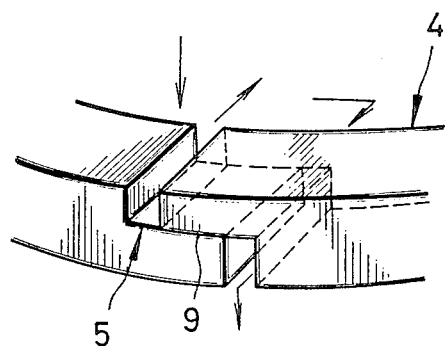
FIG. 1 is a partial perspective view illustrating a sealing ring according to the prior art.
Figure 2:
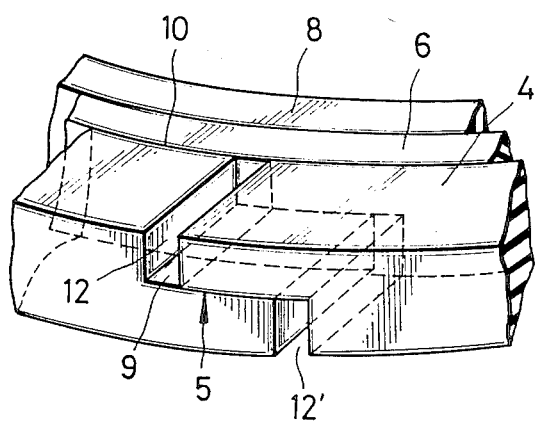
FIG. 2 is a partial perspective view illustrating a sealing ring assembly according to the prior art.
Figure 3:
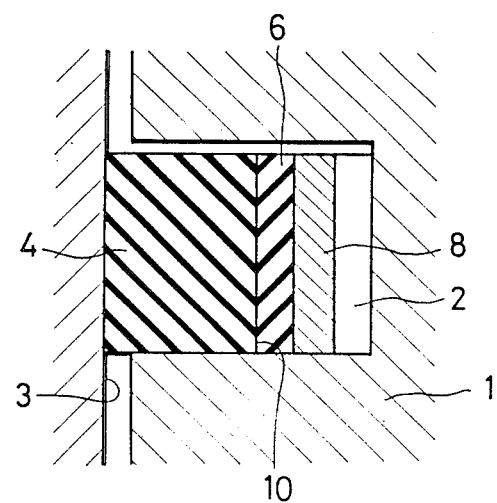
FIG. 3 is a longitudinal sectional view of the sealing ring assembly of FIG. 2.
Figure 4:
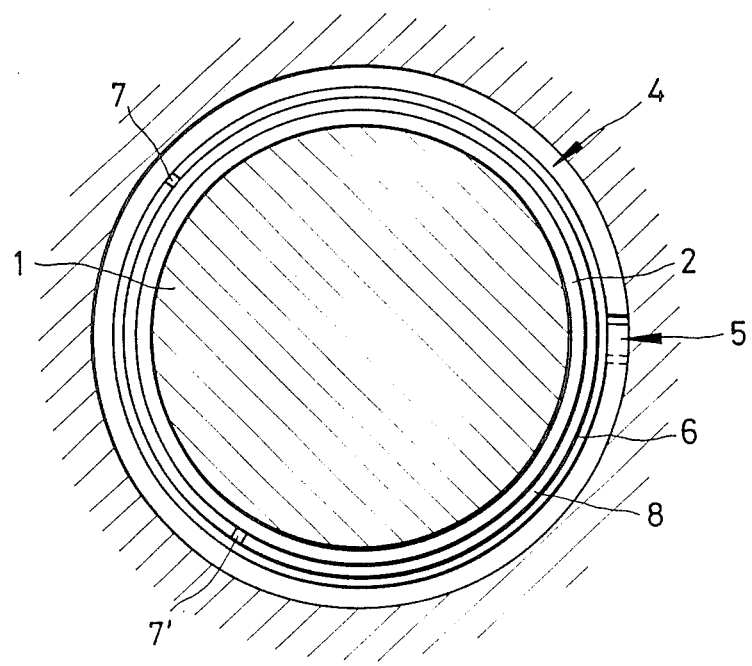
FIG. 4 is a transverse sectional view of the sealing ring assembly of FIG. 2.

The sealing ring assembly of the present invention basically represents an improvement in the sealing ring body 4 in the arrangement of FIGS. 2 through 4. Since the other components are the same, only the improvement in the sealing ring body will be described with reference to FIG. 5, it being unnecessary to describe these other components again.

Figure 5:
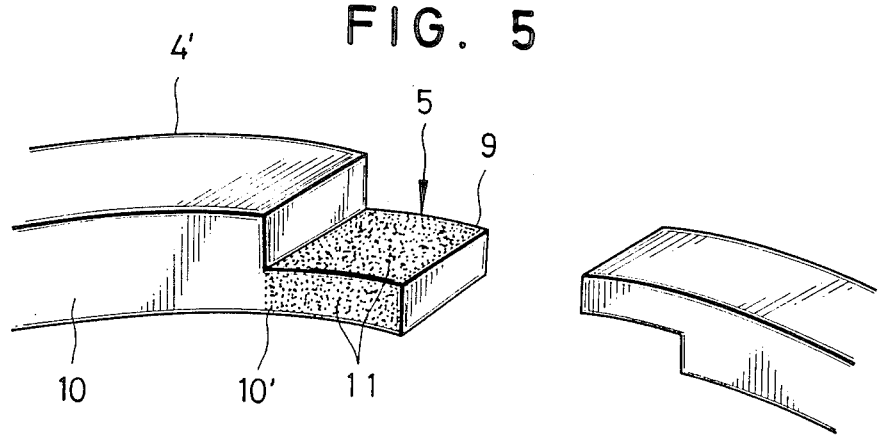
FIG. 5 is a partial perspective view illustrating a sealing ring according to the present invention.

The improved sealing ring body, indicated by numeral 4' in FIG. 5, has the stepped cut surface portion 5. The latter has the planar portion 9 and an inner circumferential surface 10', which are coated with a metal film layer 11. Metals which can be used are nickel, copper and aluminum. The metal film layer 11 is formed by a metal plating treatment, an electroless plating treatment or by using a metal foil adhesion means. Since the metal film layer 11 is formed on the one planar portion 9 and on the inner circumferential surface 10 of the stepped cut surface portion 5, the type of contact at these portions is between the metal and synthetic resin (PTFE).

The metal film layer 11 can be provided over the entire inner circumferential surface 10 of the sealing ring body 4'. Though the metal film layer can be provided on the outer circumferential surface of the gas sealing ring 6 rather than on the inner circumferential surface 10 of the sealing ring body 4', the actions and effects of the former arrangement would be the same as those of the latter.

Thus, since the invention is an improvement solely of the sealing ring body of the sealing ring assembly and does not require modification of the other basic components of the assembly, the invention can be applied in a very simple manner to existing sealing ring assemblies. The sealing ring assembly of the invention can be manufactured with very little increase in cost since the metal film layer is formed by a well-known technique.

As many apparently widely different embodiments of the present invention can be made without departing from the spirit and scope thereof, it is to be understood that the invention is not limited to the specific embodiments thereof except as defined in the appended claims.

What we claim is:

1. In a sealing ring assembly including a synthetic resin sealing ring body having an inner circumferential surface and two opposing stepped cut surface portions each of which includes a planar portion, a synthetic resin gas sealing ring in contact with the inner circumferential surface of said sealing ring body and having an inner circumferential surface, and a metal ring in contact with the inner circumferential surface of said gas sealing ring, an improvement comprising a metal film layer provided on the planar portion of one of the stepped cut surface portions and on the inner circumferential surface of at least the inner circumferential surface of this stepped cut surface portion.

2. The improvement according to claim 1, wherein said metal film layer comprises a metal selected from the group consisting of nickel, copper and aluminum.

3. The improvement according to claim 1, wherein said metal film layer is formed by metal plating.

4. The improvement according to claim 1, wherein said metal film layer is formed by electroless plating.

5. The improvement according to claim 1, wherein said metal film layer is formed by adhesion of a metal foil.

* * * * *